Nov. 11, 1969    R. K. SCHWITZGEBEL ET AL    3,478,344
BEHAVIORAL SUPERVISION SYSTEM WITH WRIST
CARRIED TRANSCEIVER
Filed June 21, 1965    2 Sheets-Sheet 1
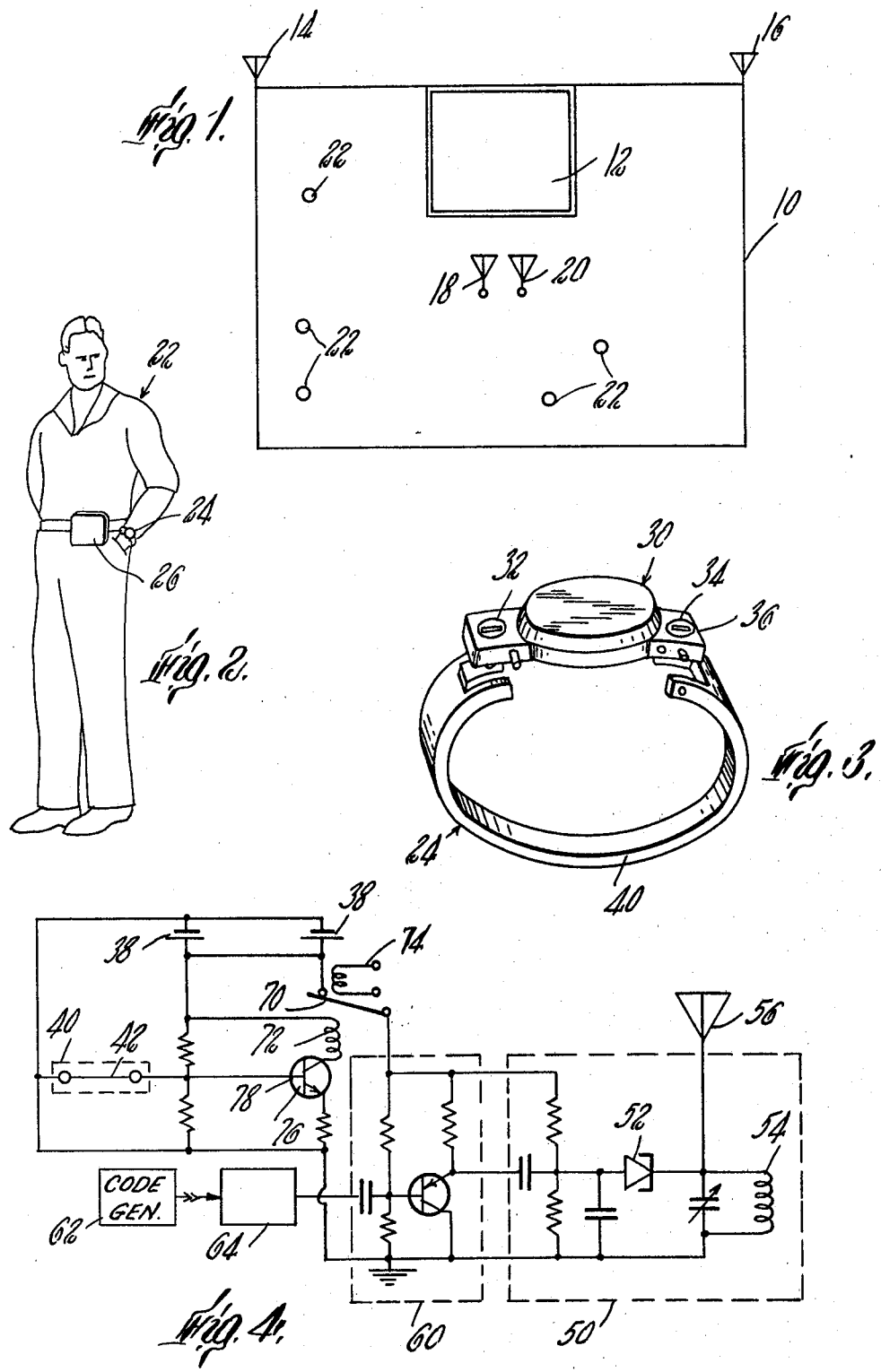

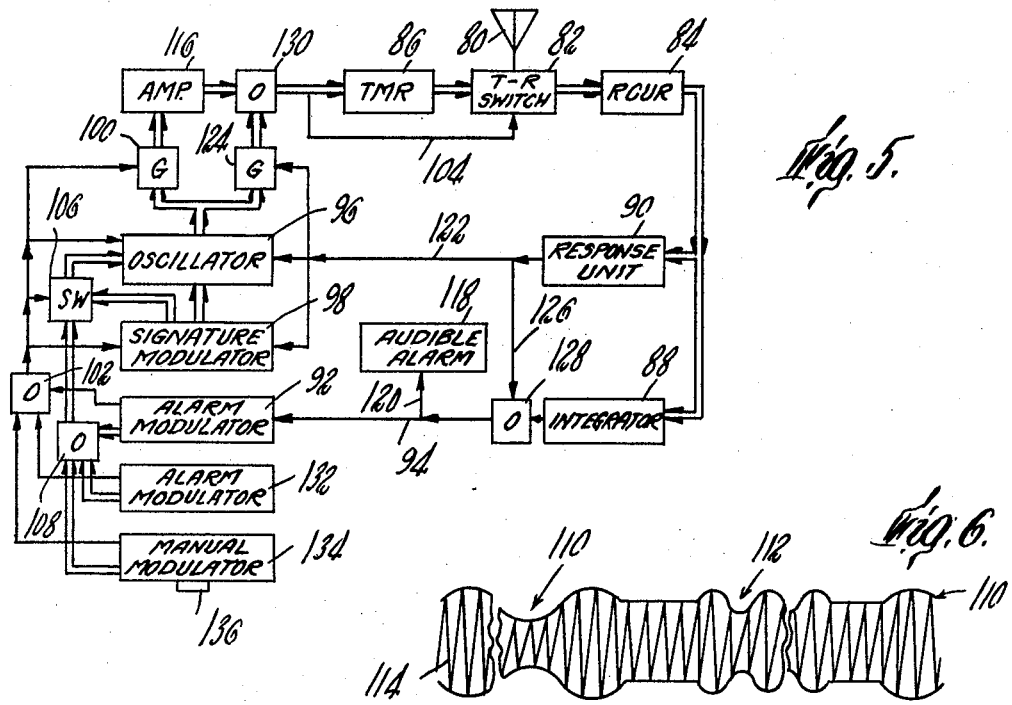
Fig. 5.
Fig. 6.
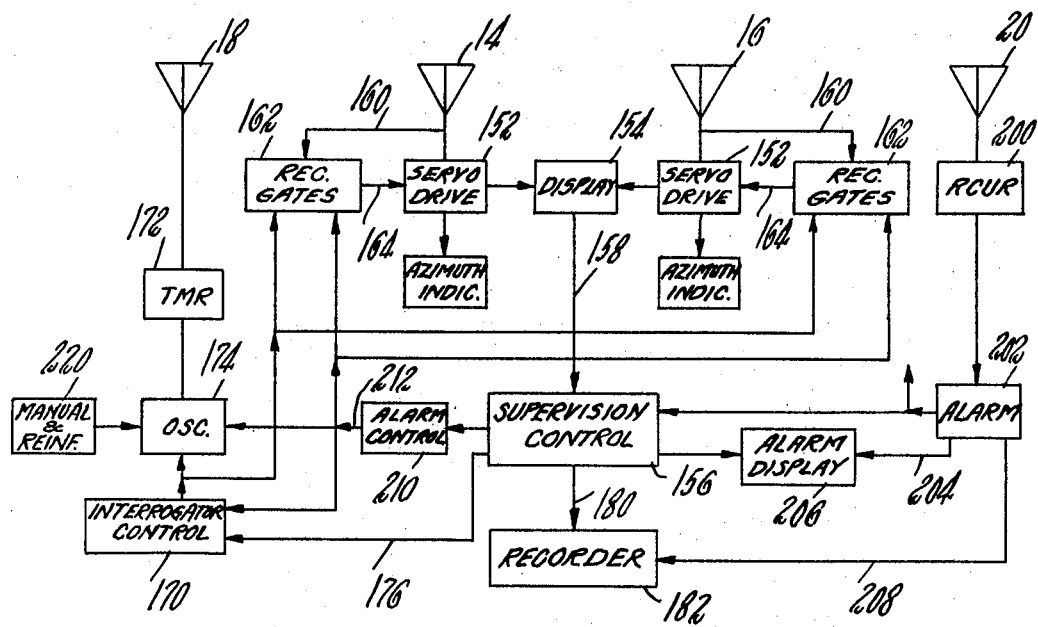
Fig. 7.

United States Patent Office 3,478,344
Patented Nov. 11, 1969

3,478,344
**BEHAVIORAL SUPERVISION SYSTEM WITH
WRIST CARRIED TRANSCEIVER**
Ralph K. Schwitzgebel, 257 Beacon St., Somerville, Mass.
02180, and William Sprech Hurd, 60 Kirkland St.,
Cambridge, Mass. 02138
Filed June 21, 1965, Ser. No. 465,306
Int. Cl. G08b 27/00, 23/00; H04m 11/02
U.S. Cl. 340—312          5 Claims

ABSTRACT OF THE DISCLOSURE

A system for analyzing and/or supervising the behavior of selected individuals includes a central station that has two directional receiving antennas, an omni receiving antenna and an omni transmitting antenna; a display; a recorder; supervisory control; and reinforcement and alarm circuits. Each selected individual carries a wrist unit and a transceiver unit. Each wrist unit includes a modulated oscillator and two battery compartments; while each transceiver includes an antenna, a transmit-receive magnetic latched switch; a receiver having a high frequency response section and a lower frequency response section; and a transmitter. The central station interrogates each transceiver in sequence and in response to a coded interrogating signal from the central station a particular transceiver transmits a response for location and identifying purposes automatically. If an emergency or unusual condition arises, a higher power signal is transmitted by a transceiver to actuate an alarm at the central station where it is recorded and displayed.

---

This invention relates to the behavioral sciences and, more particularily, to supervision systems useful for behavioral analysis, research and rehabilitation.

In human behavioral investigations heretofore conducted, the individual being studied has either been subjected to close supervision, creating an unnatural and inhibiting environment, or principal reliance has been on the individual's own subjective account of his behavior. Each technique has obvious limitations and weaknesses, and frequently the results of the studies have been inadequate. For example, in modern penology, a principal objective is the rehabilitation of convicted offenders. However, the penological tools and techniques presently commonly used involve either a high degree of situational constraint (prison) or limited supervision involving periodic contact with the individual (parole). The difference between these two techniques is so great that, in many cases, the transition from one technique to the other may produce contrare-habilitation stresses.

It is an object of this invention to provide novel and improved techniques for fostering behavioral analysis and rehabilitation.

Another object of this invention is to provide a novel and improved behavioral analysis system that facilitates research in the behavioral sciences.

A further object of the invention is to provide a novel and improved system enabling relatively continuous supervision of a subject under behavioral analysis without imposing substantial situational constraint on his freedom of movement and action.

Still another object of the invention is to provide a novel and improved behavioral supervision system which is reliable and which incorporates significant safeguards against compromise while imposing minimal situational constraint on the supervised individual.

A further object of the invention is to provide a novel and improved behavioral supervision system which facilitates reinforcement of desirable activities of the supervised person in an unobtrusive manner.

A behavioral analysis and supervision system constructed in accordance with the invention typically includes a plurality of signal sources, each being carried by an individual of the corresponding plurality of persons being supervised. Each signal source includes two components, a code generator and transceiver. The transceiver transmits a carrier signal that is modulated by a signal from the code generator. The system also includes a central station having direction indicating equipment arranged to receive signals from the transceiver and to indicate the location and identity of the transceiver as a function of the coded item signal. Each transceiver normally produce a modulated carrier output signal in response to interrogating signal from the central station which output signal is detected at the central station and provides identity and location without disturbing the supervised individual. In addition, the transceiver includes self-actuating means to transmit a modulated carrier signal at a higher power in response to abnormal conditions such as attempted destruction of the signal source or other acts which tend to compromise the supervision system. Such a higher power carrier signal upon sensing at the central station is accorded overriding priority to establish identity and location of the transceiver generating that signal.

Each signal source is a compact unit which in the preferred embodiment hereinafter described includes a wrist carried code generator oscillator unit and a transceiver unit responsive to the wrist carried oscillator. The oscillator unit is a compact continuously operative, reliable device arranged not to require fixed proximity to the transceiver unit, thus affording the supervised person a substantial amount of freedom with respect to the transceiver unit. The transceiver unit is also arranged to be easily carried by the supervised person and is compact apparatus sensitive to both the code oscillator and the interrogating signals from the central station.

The system may include provision for reinforcing signals or stimuli to be generated by the transceiver unit and/or for reinforcement processes to be initiated from the central station to the supervised person via the transceiver unit. The system thus enables a high degree of behavioral supervision and/or modification with a minimum of situational or environmental constraint. It is useful both as a research tool in behavioral analysis and as a rehabilitation tool for treatment of activities which society considers an unwise or excessive departure from an accepted norm.

Other objects, features and advantages of the invention will be seen as the following description of a particular embodiment thereof progresses in conjunction with the drawings in which:

FIG. 1 is a diagrammatic view illustrating a typical operational environment of the system of the invention;

FIG. 2 is a diagrammatic view of a supervised person carrying the signal source equipment employed in the system;

FIG. 3 is a diagrammatic view of the wrist carried oscillator compound of the signal source;

FIG. 4 is a block circuit diagram of the oscillator component of the signal source;

FIG. 5 is a block circuit diagram of the transceiver component of the signal source;

FIG. 6 is a diagram of a typical type of signal employed in the system; and

FIG. 7 is a block diagram of the central station equipment.

A relatively large supervised area is indicated by bounds 10 in FIG. 1. This area may be a mile square or larger and, for example, may be an area adjacent a security institution such as a prison 12 or an institution for mental rehabilitation. Within the boundary 10 are located two antennas 14, 16 which have directional characteristics and two omnidirectional antennas 18, 20 which preferably are located approximately in the center of the supervised area 10. Each antenna should, of course, be located to afford maximum efficiency of signal receipt or transmission to all points of the supervised area. Within the supervised area are a number of supervised persons 22, each of whom carries a wrist unit 24 and a transceiver unit 26 as best indicated in FIGS. 2 and 3.

Each unit 24, 26 is arranged to contain its own power supply and preferably each employs solid state components. The wrist unit 24 includes a modulated oscillator housed in center compartment 30 which produces a code signal that is identified with the wearer of the unit. On either side of compartment 30 is a battery compartment 32, 34 each of which has a cover 36 that may be easily opened (with a coin for example) for access to mercury cell 38 housed therein. Each cover includes a seal so that when tightened in position the compartment is waterproof. The cells 38 are connected in parallel to the oscillator circuitry and that circuitry remains energized during replacement of either battery. Otherwise, the apparatus worn on the wrist of the supervised person 22 normally requires no maintenance. The band 40 secures the oscillator on the wrist of the wearer and contains an electrical connection 42 from the cells 38 to the oscillator so that if the unit is attempted to be removed by cutting or breaking band 40 the electrical connections will be interrupted and the oscillator unit be de-energized. Additional appropriate transducer components may be attached to the wrist unit, if desired.

A block diagram of circuitry suitable for housing in the wrist unit is shown in FIG. 4. This circuitry includes an oscillator 50 which includes a tunnel diode 52 which controls tank circuit 54. The tank circuit determines the carrier frequency of the signal applied to the antenna 56 (the metal case of the wrist unit). An emitter follower amplifier circuit 60 is coupled to the input of the oscillator and modulates the output signal applied to antenna 56 by changing the bias of the anode of tunel diode 52. The input circuit of the amplifier is connected to a code generator 62 such as a crystal. Other types of code generators such as a pulse train generator may also be employed. There may be connected between the amplifier 60 and the code generator 62, a frequency divider circuit 64 to provide a modulation frequency compatible with the system requirements. The crystal source is preferably a plugable type of uint so that it may be easily inserted or removed from the oscillator by authorized personnel to vary the modulated characteristics of the carrier signal at the antenna 56. The output signal strength of this unit is such that its transmitting distance is relatively short (in the order of ten feet).

A security device coupled to the oscillator unit is relay 70 which may be of the magnetic latch type and of double pole, double throw configuration having two drive coils 72, 74. Each drive coil requires in the order of twenty milliamperes of current applied for 1.5 milliseconds to open or close the relay circuit. In either position, the relay will withstand 100g shock in all planes. Should the circuit 42 in the wrist band 40 be opened, for example, a protective circuit including transistor 76 will generate an output due to a rise in potential applied to base electrode 78 to energize coil 72 and latch protective relay 70 in its open state so that the oscillator 50 no longer produces an output. This magnetic latch relay may be reset to complete the circuit to the oscillator power supply only by specialized equipment which applies a strong magnetic pulse to coil 74 which recloses the switch 70.

The circuitry of transceiver component 26 indicated in FIG. 5, which is also carried by the supervised person, includes an antenna 80, a transmit-receive switch 82, a receiver unit 84, and transmitter unit 86. The antenna 80 may be a vertical whip or where a less obtrusive antenna is desired, a flexible non-terminated parallel radiator may be employed. Where technological and system considerations permit, two separate antennas may be utilized and the transmit-receive switch 82 omitted. This component is packaged separately to reduce the bulk of the component that is continuously attached to the supervised person. The radio link between the oscillator component 24 and the transceiver component 26 permits the transceiver to be located at a point several feet away from the oscillator, for example, during exercise or sleep. It will be understood, of course, that technological or system considerations may permit this circuitry to be usefully housed in a single component which is continuously worn by the supervised person. In this figure data signal transmission chanels are indicated by double line and control signal transmission channels are indicated by single line.

The transmit-receive switch 82, which may be a solenoid operated mercury wetted contact double pole, double throw magnetic latched switch, is normally in the receive condition and applies signals from the oscillator 24 to receiver 84. The receiver unit 84 has two sections, a high frequency response section which receives signals from the key oscillator 24 and passes the demodulated signal (either tone or pulse train) to an integrator circuit 88; and a lower frequency response section which detects signals from the control station antenna 18 and energizes the response unit 90.

The output of integrator 88 provides a conditioning level to alarm modulator 92 over line 94 and as long as the output is present, modulator 92 does not respond. However, should the key oscillator 24 be damaged or be moved out of the receiving range of the transceiver 26, the signal on line 94 will drop below to preset threshold and the alarm modulator circuitry 92 will be energized to actuate the carrier generator oscillator 96, signature modulator 98 and amplifier gate 100 via OR circuit 102 to produce a characteristic coded (e.g. modulated carrier) output signal which output signal switches the transmit-receive switch 82 to the transmit mode (line 104) and causes transmitter 86 to apply a relatively high-power modulated carrier signal to antenna 80 for transmission to the control station. The output of modulator 92 also actuates switch 106 (via OR circuit 108) so that the alarm modulating frequency and the signature modulating frequency are alternately applied to oscillator 96. The transmitted modulated carrier signal includes, as indicated in FIG. 6, a signature portion 110 generated by modulator 98 and a data portion 112 generated by modulator 92. These two portions are alternately applied to modulate carrier 114 which may be in the 30–150 mc. range. This signal is amplified by amplifier stage 116 prior to application to transmitter 86. Preferably the frequency modulation characteristics of modulators 62 and 98 are the same and are unique to each supervised person.

The control circuitry in the transceiver also includes an audible alarm 118 and the signal on line 94 is also applied over line 120 to energize that alarm when the oscillator 24 is out of range of transceiver unit 26. This alerts the supervised person to take corrective action so that the system may be returned to proper operating condition. Thus, as long as the oscillator signals applied to integrator circuit 88 are of sufficient magnitude, the relationship of these two units is acceptable.

When a low frequency interrogating signal from the control station is detected, the response unit 90 provides an output over line 122 to actuate oscillator 96, signature modulator 98 and amplifier bypass gate 124. The output of modulator 104 actuates oscillator circuit 96 to generate a carrier signal modulated in a similar manner to the response of that circuit to a signal from modulator 92 but without the transmission of accompanying data. (A signal from response unit 90 may be applied over line 126 to OR circuit 128 to prevent actuation of modulator 92 and alarm 118 during the interval of interrogation.) The output of OR circuit 130 switches the transmit-receive switch 82 to the transmit mode and the modulated carrier is applied to transmitter 86 for transmission at a relatively low power (the final amplification stage 116 being by-passed) via antenna 80 to the central station. This transmission may continue automatically for a predetermined time normally sufficient for the directional antennas 14 and 16 to identify the location of the transceiver 26. (Should the interrogating signal still be present when the switch 82 returns to its receive mode, this location identifying cycle is repeated. Where two separate antennas are employed in the transceiver the central station may signal completion of its location identifying function to terminate this transmission mode.)

In addition, circuit 96 has actuating inputs from alarm modulator unit 132 and manual input modulator unit 134. The alarm unit 132 includes a three axis accelerometer, and an electric circuit integrity senser and it generates an output when the transceiver equipment 26 is being subjected to destructive forces which output actuates circuit 96 to transmit a high power signal (generated through use of the final stage 116 of amplification) in the same manner as in response to a signal from circuit 92 but with a different data (frequency) modulation portion. The transmitted signal includes code (signature) information to identify the transceiver 26 (the supervised person) and is of sufficient power to be sensed by the omnidirectional antenna 20.

The manual signal input unit 134 includes actuating control 136 which allows the supervised person to signal the control station to request reinforcement for some behavior pattern. Through selection of one of several data modulation frequencies the supervised person may request one of several different types of information or action dependent on the environmental situation in which this behavioral supervision system is employed. Again, a typical arrangement for this modulator would enable via switch 106 alternate transmission of the signature frequency 110 and a second frequency 12 uniquely characteristic of the transmitted type of reinforcement request or other information as indicated in FIG. 6, each of which modulates carrier 114. Other forms of information transmission, such as digital (e.g. pulse train) coding may also be used although frequency coding circuitry may be realized in more compact physical form with present technology.

Reinforcement information is signaled to the supervised person via audible alarm unit 98. A variety of requests may also be made from the central station, which requests may actuate auxiliary transducers attached to the wrist unit 24 or the transceiver 26, for example.

A block diagram of the equipment at the control station is shown in FIG. 7. That equipment receives signals from the two directional antennas 14 and 16 and from the omnidirectional antenna 20, and sends signals out to the supervised transceivers 26 from the omnidirectional antenna 18. Each antenna is, of course, desirably located to maximize its response over the supervised area, e.g. avoiding locations of signal interference. Each of the directional antennas 14 and 16 includes a conventional servo drive unit 152 which supplies a signal indicative of the position of the antenna to a display unit 154. That display unit 154 may display directly location information in x-y coordinate form and also supplies location information to supervision control circuitry 156 over cable 158. Coupled to the output line from each directional antenna via lines 160 is a receiving gate unit 162. Received signal amplitude information is fed back over lines 164 to the servo drive units 150 so that those units control the antennas 14, 16 to maintain the signal amplitude on lines 160 at a maximum. The response of receiving gates 162 which demodulate the coded carrier, is correlated by interrogation control unit 170 which establishes the identitfy of the supervised transceiver 26 that should be sending the signals at that time. That control unit 170 applies appropriate frequency signals to modulate a carrier generated by oscillator 174 for application to transmitter 172. The interrogating signal is radiated from antenna 18 and when decoded by the particular specified transceiver 26 causes that transceiver to transmit a response for location and identifying purposes automatically.

Each transceiver 26, once actuated in a transmitting mode, continues to transmit for a predetermined interval. As soon as the location of the interrogated transceiver 26 has been identified by supervision control 156, that unit applies an output signal over line 176 to the interrogation control unit 170 to switch that control to the frequency of the next supervised transceiver 26 to be interrogated. The interrogation signal may alternately be digitally coded although frequency coding for this purpose is realizable in compact hardware.

The supervision control circuitry 156 also provides outputs over lines 180 to recorder 182 to record position and identify information in a continuous manner which records enable cumulative analysis of activities of the supervised persons.

Should an emergency arise as signaled by an alarm from one of the transceivers, such higher power signals are sensed by omnidirectional receiving antenna 20. Receiver 200 coupled to antenna 20 demodulates the coded carrier signal and energizes alarm circuit 202 to provide an appropriate audible or other alarm signal. Signals are also applied over lines 204 to energize a visual alarm display 206 which is also controlled by display information furnished by the supervision control unit 156. Also, the alarm signal information is transmitted overlines 208 to recorder 182.

The alarm signal is transmitted to control unit 156 which produces an output to energize alarm control unit 210. The resulting outputs of that unit (on line 212) (1) overrides the interrogation control unit 170 and disables its stepping, (2) modulates oscillator 174 with that identity code of the transceiver generating the alarm to transmit an interrogation signal over antenna 18 to that transceiver and (3) conditions the receiving gates 162 to respond to received signals from that transceiver. Thus, on receipt of an alarm signal, a signal from antenna 18 interrogates the particular transceiver unit sending the alarm and causes it, if it is capable, to generate position identifying information to which the directional antennas 14, 16 respond to display and update the stored location information with respect to that transceiver.

Reinforcement information and request signals are applied from modulator unit 220 as controlled by supervision control 156 to transmitter 172 and are transmitted with the interrogation signal information when such operation is desired. In such cases a typical transmission is a receiver identity code followed by an information code similar to that shown in FIG. 6.

It will be obvious that the disclosed behavioral supervision system has a variety of applications, including the monitoring of persons under relatively highly supervised conditions as in vicinity of a prison (maximum security institution) in which the monitored persons are allowed a somewhat higher degree of freedom than was heretofore conventionally available while maintaining a substantial degree of security control over their movement. Within such a system, should a supervised person approach a boundary beyond which he should not go, the system may automatically transmit an audible signal to the supervised person warning him of his impending violation of the conditions of his supervised freedom. It will be obvious that the system may supervise a much larger area with increase in the power and/or sensitivity capabilities of the system components. The supervision and recording of the actvities in a locational sense of the supervised person may be of great value in the rehabilitation and/or understanding of the motivation of that person. As indicated above, a variety of transducers, such as counters, tape recorders, cameras, and measuring instruments may be carried by the supervised person and actuated and/or interrogated from the base station for control or behavioral research purposes. Further, the system also may be used with socially or mentally disturbed persons to supervise their activities with a view towards rehabilitation. The reinforcement potential of the system by which the supervised person may be rewarded upon or during performance of a desirable activity may contribute significantly towards rehabilitation.

What is claimed is:

1. A behavioral supervision system comprising a control station including means for transmitting interrogating signals, signal receiving means, and control means for actuating said interrogating signal transmitting means periodically, and a portable transceiver unit arranged to be carried by a supervised individual including a component secured to the supervised individual, signal transmitting means, signal receiving means, means for generating a transceiver unit identity signal, means for generating a plurality of distinct data signals, means for actuating said data signal generating means to generate one of said data signals in response to attempted removal of said component from the supervised individual, means responsive to an interrogating signal received by said signal receiving means from said control station for applying to said signal transmitting means said identity signal, and means responsive to a condition at said transceiver unit for applying to said signal transmitting means said identity signal and a data signal.

2. A behavioral supervision system comprising a control station including means for transmitting interrogating signals, directionally sensitive signal receiving means, directionally insensitive signal receiving means, first control means for actuating said interrogating signal transmitting means periodically, and second control means responsive to a signal from said directionally insensitive signal receiving means for overriding said first control means and actuating said interrogating transmitting means, and a portable transceiver unit arranged to be carried by a supervised individual including a component secured to the supervising individual, signal transmitting means, signal receiving means, means for generating a transceiver unit identity signal, means for generating a plurality of distinct data signals, means for actuating said data signal generating means to generate one of said data signals in response to attempted removal of said component from the supervised individual, means responsive to an interrogating signal received by said signal receiving means from said control station for applying to said signal transmitting means said identity signal, and means responsive to a condition at transceiver unit for applying to said signal transmitting means said identity signal and a data signal.

3. A behavioral supervision system comprising a plurality of signal generators and a central control station including signal receiving equipment responsive to signals from individual transmitters for indicating the location and code identification of the signal generators, means for transmitting signal generator interrogating signals, and control means for actuating said interrogating signal transmitting means periodically, each signal generator being arranged to be carried by a supervised person and each including means to generate an unique code signal identifying that person including means for securing the code signal generating means to the supervised person, said securing means including a member adapted to encircle a limb of the supervised person, and a circuit component disposed in the encircling member so that the unique code signal is not generated if the encircling member is interrupted, a transmitter responsive to said unique code signal, means to actuate said transmitter in response to a particular interrogating signal from said control station to routinely supply a location and identity signal, and means to automatically generate a second signal when said transmitter fails to detect said code signal.

4. The behavioral supervision system as claimed in claim 3 wherein said unique code signal generating means includes two power sources connected in parallel so that said code signal generating means remains energized during replacement of either source.

5. The behavioral supervision system as claimed in claim 4 wherein said code signal generating means includes an oscillator; said transmitter includes a second oscillator and a modulator responsive to said unique code signal for modulating the output of said second oscillator, and an alarm modulator operative when said transmitter fails to detect said code signal; and said central control station includes a first receiver antenna means for receiving location and code identification signals from said signal generators, second antenna means for receiving said second signals, and third antenna means for transmitting said interrogating signals.

References Cited

UNITED STATES PATENTS

| | | | |
|---|---|---|---|
| 1,250,743 | 12/1917 | Williams | 340—280 |
| 2,597,517 | 5/1952 | Noble | 340—312 |
| 3,092,829 | 6/1963 | Kleist | 340—312 X |
| 3,115,622 | 12/1963 | Jaffe | 340—312 X |
| 3,257,653 | 6/1966 | McCorkindale | 340—224 |
| 2,561,421 | 7/1951 | Seale et al. | 325—16 X |
| 2,910,683 | 10/1959 | Todd | 340—177 R |

JOHN W. CALDWELL, Primary Examiner

H. I. PITTS, Assistant Examiner

U.S. Cl. X.R.

128—2; 325—16, 64, 111, 118; 340—280, 311, 313